May 8, 1945.   H. KLEMPERER   2,375,229
ELECTRIC CONTROL APPARATUS
Filed Aug. 30, 1943
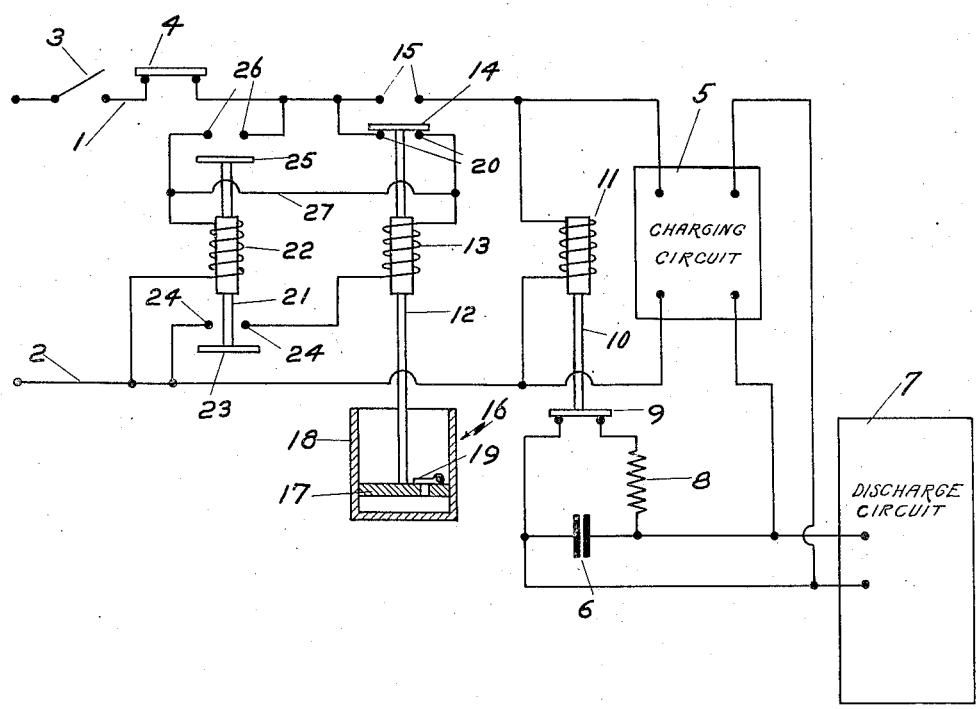
INVENTOR.
HANS KLEMPERER,
BY Elmer J. Gorin
ATTY.

Patented May 8, 1945

2,375,229

UNITED STATES PATENT OFFICE 2,375,229

ELECTRIC CONTROL APPARATUS

Hans Klemperer, Belmont, Mass., assignor to Raytheon Manufacturing Company, Newton, Mass., a corporation of Delaware Application August 30, 1943, Serial No. 500,544

3 Claims. (Cl. 175—320)

This invention relates to electric control apparatus, and particularly to a safety relay apparatus for condenser charging and discharging systems.

In condenser charging and discharging systems, such for example as condenser welding systems, it is common practice to house the condensers and associated elements of the system in a cabinet. The condensers, usually a battery of electrolytic condensers, may be at a high voltage and it is desired to insure that these be discharged whenever the door to the cabinet is opened. To this end a door switch is provided which upon opening of the cabinet door opens the charging circuit and closes a shunt circuit which permits the condenser to discharge through a suitable resistance.

The present invention has for its object to improve such systems and to avoid certain difficulties which arise if the contact fails to close or, if due to vibration of the floor, the door switch chatters upon its seat.

The invention will be made fully apparent to those skilled in the art from a consideration of the following detailed description taken in conjunction with the accompanying drawing in which:

The single figure is a schematic illustration of an electrical control apparatus constructed in accordance with this invention.

In the illustrative embodiment shown, current from a suitable source connected to conductors 1 and 2 is supplied by way of a manually operable switch 3, a door switch 4, and a charging circuit 5, to an energy storage device such as a condenser 6. It will be understood that the charging circuit 5 may include a suitable rectifying system and usually some means for controlling the voltage to which the condenser 6 is charged.

The condenser 6 is connected to a suitable discharge circuit 7 which may include a suitable means for timing the discharge of the condenser 6 and other control features desired to regulate and control the discharge as well as a suitable load, such as a resistance welding load.

The condenser 6 is provided with a shunt circuit connecting the opposite sides thereof and including a resistance 8. The shunt circuit is controlled by the armature 9 of the relay switch 10. An actuating coil 11 is energized from the supply circuit to maintain the shunt circuit open when the supply to the charging circuit 5 is closed, and is adapted upon deenergization to close the shunt circuit and permit the condenser to discharge therethrough.

A relay switching means 12 actuated by a solenoid coil 13 is provided with an armature 14 coacting with contacts 15 in the supply circuit between the door switch 4 and the line leading to coil 11 and charging circuit 5. The switching means 12 is provided with a time delaying means 16 for retarding the movements thereof. In the instance shown a piston 17 and a dashpot 18 are provided with a valve 19 which permits the switching means to move freely on deenergization of the coil 13, but which retards the movement in the direction to close the contacts 15 upon energization of the coil 13. A second pair of contacts 20 are closed by armature 14 at the limit of the downward movement of the switching means 12. Closure of these contacts closes an energization circuit for the coil 13 under circumstances hereinafter described.

A holding relay 21, having a coil 22 adapted to be energized by the supply circuit, is provided with an armature 23 which coacts with contacts 24 to close a circuit through coil 13 of the relay 12 whenever the coil 22 is energized. A second armature 25 on the holding relay 21 is adapted to close a circuit through the contacts 26 to energize both coils 22 and 13.

In operation if either the main switch 3 or the door switch 4 is open, the coil 11 is deenergized and the relay 10 closes the shunt circuit of the condenser 6 discharging the condenser through resistance 8. Likewise the coils 13 and 22 are deenergized. The relays 12 and 21 drop to the position shown in which the supply circuit to the coil 11 and the charging circuit 5 is open at the contacts 15. A circuit to the coil 13 is closed by the armature 14, but since the coil 22 is deenergized the energizing circuit of the coil 13 is open at the contacts 24 of the holding relay 21. The normal energization circuit for coil 22 of holding relay 21 is open at the contacts 26, but another circuit for the energization of the coil 22 is provided by way of contacts 20 and a conductor 27 forming a cross-connection between coils 13 and 22. Accordingly, if the main switch 3 and the door switch 4 are now closed, the coils 11 and 13 will momentarily remain deenergized, but the coil 22 on the holding relay 21 will now be energized by way of conductor 27. Upon the energization of the coil 22 the armature 23 closes a circuit through contacts 24 to energize the coil 13. The armature 25 closes a circuit through the contacts 26 to provide for the energization of the coils 22 and 13 by way of the conductor 27. The armature 12 now moves in a direction to close the supply circuit through the contacts 15. In so moving it opens the circuit through the contacts 20, but current for energization of the coils 22 is now supplied by way of contacts 26 so that relay switch 21 is still held in its closed position.

The relay 12 is retarded in its upward movement due to the fact that communication between the opposite sides of the piston 17 is more restricted during the upward motion of the piston than during the downward motion. The check valve 19 permits relatively free flow of fluid between the two sides of the piston 17 during the downward movement of the piston, but is closed during the upward movement. As long as current is supplied to the holding coil 22, current will be supplied to the coil 13 and the relay 12 will continue to move upwardly until the line leading to the coil 11 of the armature 10 and to the charging circuit 5 is closed through the contacts 15. Thereupon the coil 11 is energized and the armature 9 is moved to open the shunt circuit of the condenser 6. The condenser is now charged by the charging circuit 5 and the system is in operating condition.

It will be seen that if the supply circuit has not been properly closed by the door switch 4 as where the door has been swung shut but not fully secured or latched and the door tends to swing open again, then the holding switch 21 will immediately open the energization circuits for the coils 13 and 22. The time delay relay switch 12 will be stopped in the course of its upward movement and must return to its lowermost position where the circuit through the contacts 20 will be closed before the coils 22 and 13 can be energized. Thus, the repeated opening and closing of all of the relay switches during the interval when the door switch is being closed and the door to the cabinet properly secured are prevented. Even in the normal closing of the door to the cabinet some chatter of the door switch may occur and this would cause a corresponding chatter of the relay switching means resulting in rapid deterioration of these parts. Where the relay switching means controls high voltage circuits, as in the case of relay 10, this chatter would be particularly objectionable. The present invention obviates all of such difficulties.

While there has been herein described but a single embodiment of the invention other embodiments and arrangements within the scope of the appended claims will be obvious to those skilled in the art from a consideration of the exemplification of the invention herein disclosed.

What is claimed is:

1. In combination, a supply circuit, a load circuit, a relay energized by said supply circuit through an energizing circuit, a second relay energized from said supply circuit through a first control circuit and adapted upon deenergization to open said energizing circuit, time delay means for retarding the movement of said second relay upon energization thereof, a holding relay energized from said supply circuit through a second control circuit and adapted upon deenergization to open said first control circuit to deenergize said second relay, said second relay having contacts which upon deenergization of said second relay close said second control circuit, and said holding relay being adapted upon energization to by-pass said contacts to maintain said second control circuit and to close said first control circuit for energizing said second relay.

2. In combination, a supply circuit, a load circuit, a relay energized by said supply circuit through an energizing circuit, a second relay energized from said supply circuit through a first control circuit and adapted upon deenergization to open said energizing circuit, time delay means for retarding the movement of said second relay upon energization thereof, and a holding relay energized from said supply circuit through a second control circuit and adapted upon deenergization to open said first control circuit to deenergize said second relay, said second relay having contacts which upon deenergization of said second relay close said second control circuit.

3. In combination, a supply circuit, a load circuit, relay switching means having an energizing circuit and controlling said supply circuit, time delay means for retarding the closing movement of said relay switching means, a holding relay energized by said supply circuit through an energizing circuit and adapted upon deenergization to open said energizing circuit of said relay switching means, said relay switching means being adapted upon deenergization to close said energizing circuit of said holding relay, and said holding relay being adapted upon energization to close both of said energizing circuits for maintaining the energization thereof and for energizing said first-mentioned relay.

HANS KLEMPERER.